United States Patent [19]

McIsaac et al.

[11] Patent Number: 5,552,610

[45] Date of Patent: Sep. 3, 1996

[54] DEVICE AND METHOD FOR ACCURATELY MEASURING CONCENTRATIONS OF AIRBORNE TRANSURANIC ISOTOPES

[75] Inventors: Charles V. McIsaac; E. Wayne Killian, both of Idaho Falls; Ervin G. Grafwallner, Arco; Ronnie L. Kynaston, Blackfoot; Larry O. Johnson, Pocatello; Peter D. Randolph, Idaho Falls, all of Id.

[73] Assignee: Lockheed Idaho Technologies Company, Idaho Falls, Id.

[21] Appl. No.: 315,012

[22] Filed: Sep. 29, 1994

[51] Int. Cl.[6] .................................................. G01T 7/04
[52] U.S. Cl. ............................... 250/435; 250/370.02
[58] Field of Search ............................. 250/370.02, 435, 250/DIG. 2, 255

[56] References Cited

U.S. PATENT DOCUMENTS

| | | | |
|---|---|---|---|
| 2,892,091 | 6/1959 | Sawle | 250/435 X |
| 3,109,096 | 10/1963 | Spaa | 250/435 X |
| 4,128,539 | 7/1992 | Rogers et al. | 250/255 |
| 4,132,894 | 1/1979 | Yule | 250/435 |
| 4,808,827 | 2/1989 | Woollam | 250/435 X |
| 5,235,190 | 8/1993 | Tucker et al. | 250/435 |

Primary Examiner—Carolyn E. Fields
Assistant Examiner—Edward J. Glick
Attorney, Agent, or Firm—Alan D. Kirsch

[57] ABSTRACT

An alpha continuous air monitor (CAM) with two silicon alpha detectors and three sample collection filters is described. This alpha CAM design provides continuous sampling and also measures the cumulative transuranic (TRU), i.e., plutonium and americium, activity on the filter, and thus provides a more accurate measurement of airborne TRU concentrations than can be accomplished using a single fixed sample collection filter and a single silicon alpha detector.

18 Claims, 6 Drawing Sheets

DEVICE AND METHOD FOR ACCURATELY MEASURING CONCENTRATIONS OF AIRBORNE TRANSURANIC ISOTOPES

CONTRACTUAL ORIGIN OF THE INVENTION

The United States Government has rights in this invention pursuant to Contract No. DE-AC07-76ID01570 between the United States Department of Energy and EG&G Idaho, Inc.

TECHNICAL FIELD

This invention relates to an alpha continuous air monitor (CAM) and more particularly to a CAM utilizing two silicon alpha detectors and multiple rotatable sample collection filters to measure airborne alpha activity as a function of time.

BACKGROUND OF THE INVENTION

An apparatus for monitoring air for alpha emitting particles is described in a paper by T. J. Yule, "An On-Line Monitor For Alpha Emitting Aerosols", *IEEE Trans on Nucl Sci*, Vol. NS-25, No. 1: 762–766, February 1978), where the sensitivity of the readings is enhanced by the use of an inertial impactor in conjunction with a continuous air monitor (CAM). This alpha CAM is equipped with a two-stage inertial impactor to remove radon progeny and concentrate airborne transuranic (TRU) bearing particulates. The two-stage impactor of Yule works as follows: Air, which is sampled at about 280 L/min, is drawn through a circular array of inlet jets and is directed towards a complementary array of receiving tubes. A major portion of the air leaving the jets (200 L/min) is drawn off laterally before the airstream enters the receiving tubes. Small particles entering the inlet jets follow the lateral flow of air and do not enter the receiving tubes. Large particles not able to follow the lateral airflow enter the receiving tubes. This arrangement is repeated in a second stage in the impactor, with the lateral flow in this stage being about 60 L/min. In principle, the major (260 L/min) airflow exhausted from the impactor contains the vast majority of the radon and thoron daughters that were present in the sample air stream, and the minor (20 L/min) airflow exiting the second set of receiving tubes contains most of the TRU-bearing particulates that entered the impactor.

This minor airflow exiting the second stage of the impactor is directed to a sample collection filter spaced about 7 mm below a planar silicon detector. The measurement of airborne TRU isotopes using existing rapid transuranic monitoring laboratory (RTML) alpha CAMs, which are each equipped with a single fixed sample collection filter, is complicated by the accumulation of TRU activity and dust on the filter during sampling. The average airborne concentration of a TRU isotope over any given interval during sampling is determined through sequential analysis of the cumulative alpha spectrum of aerosols trapped by the filter. Using conventional techniques for sampling alpha particles, the general equation for the number of net counts in a TRU alpha peak at the end of sampling interval n is:

$$C_n = C_{n-1} + 2.22\epsilon \left\{ \sum_{i=1}^{n-1} Y(X_{Pu})_i F_i \Delta t_i \right\} \Delta t_n + 2.22\epsilon Y(X_{Pu})_n F_n \frac{\Delta t_n^2}{2} \quad (1)$$

where:

$C_n$=net counts in TRU alpha peak at the end of sampling interval n;

$C_{n-1}$=net counts in TRU alpha peak at the beginning of sampling interval n;

2.22=number of disintegrations per minute per pCi;

$\epsilon$=absolute counting efficiency of detector (counts per disintegration);

y=activity collection efficiency of CAM;

$(X_{Pu})_i$=airborne concentration of TRU isotope during sampling interval i (pCi/liter);

$F_i$=average sampling flow rate during sampling interval i (liters per minute);

$\Delta t_i$=length of sampling interval i (minutes);

$\Delta t_n$=length of sampling interval n (minutes);

$(X_{Pu})_n$=airborne concentration of TRU isotope during sampling interval n (pCi/liter); and $F_n$=average sampling flow rate during sampling interval n (liters per minute).

Equation (1) shows that for conventional methods for sampling alpha activity, at the end of sampling interval n, the net counts in a TRU alpha peak, $C_n$, is equal to the sum of the net counts already accumulated in the peak at the start of the sampling interval, plus the net counts accumulated in the peak during the interval due to TRU activity already deposited on the sample collection filter prior to the start of sampling interval n, plus the net counts accumulated in the peak due to the TRU activity deposited on the filter during sampling interval n. From Equation (1) the average airborne concentration of a TRU isotope during a given sampling interval n, $(X_{Pu})_n$, is:

$$(X_{Pu})_n = \frac{(C_n - C_{n-1}) - (C_{n-1} - C_{n-2})(\Delta t_n/\Delta t_{n-1})}{2.22\epsilon Y F_n \frac{\Delta t_n^2}{2}} - (X_{Pu})_{n-1} \frac{\Delta t_{n-1}}{\Delta t_n} \frac{F_{n-1}}{F_n} \quad (2)$$

Equation (2) shows that the airborne TRU concentration calculated for sampling interval n is dependent on the airborne concentration calculated for the preceding sampling interval, and consequently, is also dependent on the airborne concentrations calculated for all preceding sampling intervals. Therefore a disadvantage of conventional alpha continuous air monitoring techniques that utilize a single fixed sample collection filter is the inability to accurately measure the alpha activity at regular intervals over time.

It is an object of this invention to provide an alpha continuous air monitor capable of measuring alpha activity as a function of time.

It is another object of this invention to provide a method for accurately measuring the total TRU activity on a sample collection filter at regular interval s during air sampling in order to decouple airborne concentrations calculated from successive sampling intervals.

Additional objects, advantages and novel features of the invention will become apparent to those skilled in the art upon examination of the following and by practice of the invention.

SUMMARY OF THE INVENTION

To achieve the foregoing and other objects the present invention utilizes two silicon alpha detectors and a plurality of sample collection filters with a two-stage inertial impactor. In a preferred embodiment of this invention three sample collection filters are utilized as follows: one positioned in the sample airstream beneath the alpha detector mounted in the bottom of the inertial impactor, a second inside a decay chamber isolated from the sample airstream, and a third positioned beneath the second alpha detector. The multiple filters are spaced at predetermined locations on a filter holder. Preferably, when three filters are used each filter is spaced approximately 120° apart on the filter holder assembly. The filter assembly can then be rotated 120° at the end of each sampling interval, typically at least 10 minutes, so that the filter assayed by the second detector will be returned to the sample airstream at the same time the filter in the decay chamber is moved beneath the second detector. The delay time before counting allows the vast majority of the 3.1-minute $^{218}$Po on the sample collection filter to decay away before the filter is assayed by the second alpha detector. $^{218}$Po emits an alpha particle with an energy of 6.00 MeV as shown at 10 in FIG. 1. The low-energy tail 12 of the $^{218}$Po alpha peak contributes background counts to the region of the spectrum containing the TRU alpha peaks of interest, i.e., the $^{239}$Pu and $^{241}$Am areas at 14 and 16, respectively. In this manner, monitoring would remain continuous, but the total activity of the TRU isotope accumulated on the sample collection filter would be measured by the second detector prior to the reinsertion of the filter into the sample airstream at the start of the next sampling interval. The airborne TRU concentration during sampling interval n would then be calculated using the following equation:

$$(X_{Pu})_n = \frac{(C_n - C_{n-1}) - C_{An-1}(\epsilon_1/\epsilon_2)(\Delta t_n/\Delta t_{n-1})}{2.22\epsilon_1 YF_n \frac{\Delta t_n^2}{2}} \quad (3)$$

where $C_{An-1}$ is the net counts in the TRU alpha peak measured by the second detector and $\epsilon_1$ and $\epsilon_2$ are the absolute counting efficiencies of detectors one and two, respectively. This approach will require that the cumulative alpha spectrum of the filter positioned in the outlet of the impactor be stored separately from the spectrum measured with the second silicon detector. The alpha spectra measured with the detector installed in the impactor will be analyzed to determine $(C_n-C_{n-1})$. The alpha spectra measured using the second detector will be analyzed to determine $C_{An-1}$ and then erased following each measurement.

If the variables in Equation (3) remain constant, the equation can be rewritten as $C_n=C_{n-1}+AC_{An-1}+B(X_{Pu})_n$, wherein the second term ($AC_{An-1}$) is the counts from activity already on the filter at the beginning of the sampling interval (n) and the third term ($B(X_{pu})_n$) is the counts from activity deposited on the filter during sampling interval (n). $C_n$ and $C_{n-1}$ are measured by the first detector, the detector in the airstream exhausting the impactor and $C_{An-1}$ is measured by the second detector, the detector that measures the filter following decay prior to reinsertion into the airstream.

DETAILED DESCRIPTION OF THE INVENTION

Figure 2:
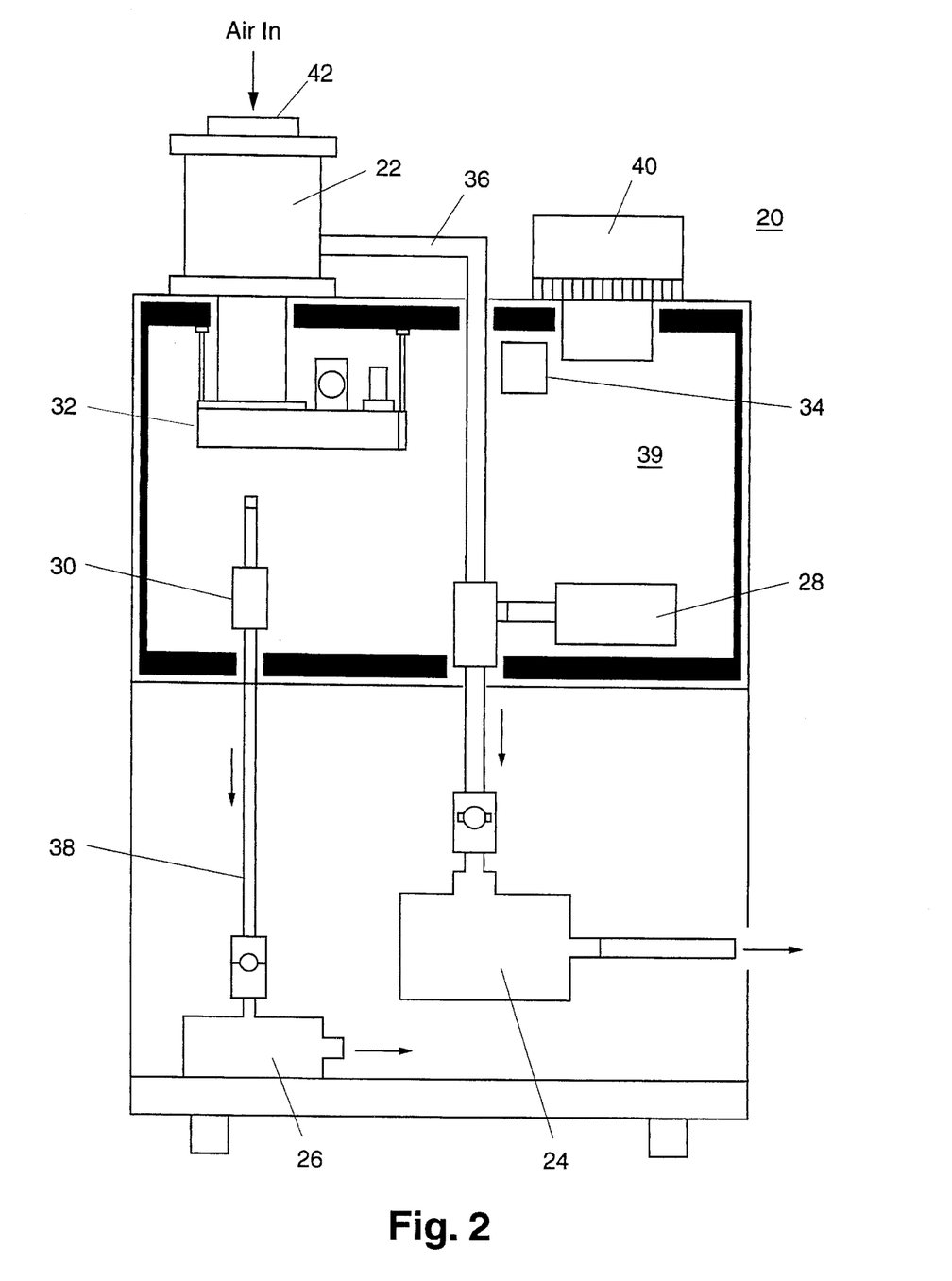
FIG. 2 is a schematic diagram of an alpha continuous air monitor system of the present invention.
Figure 7:
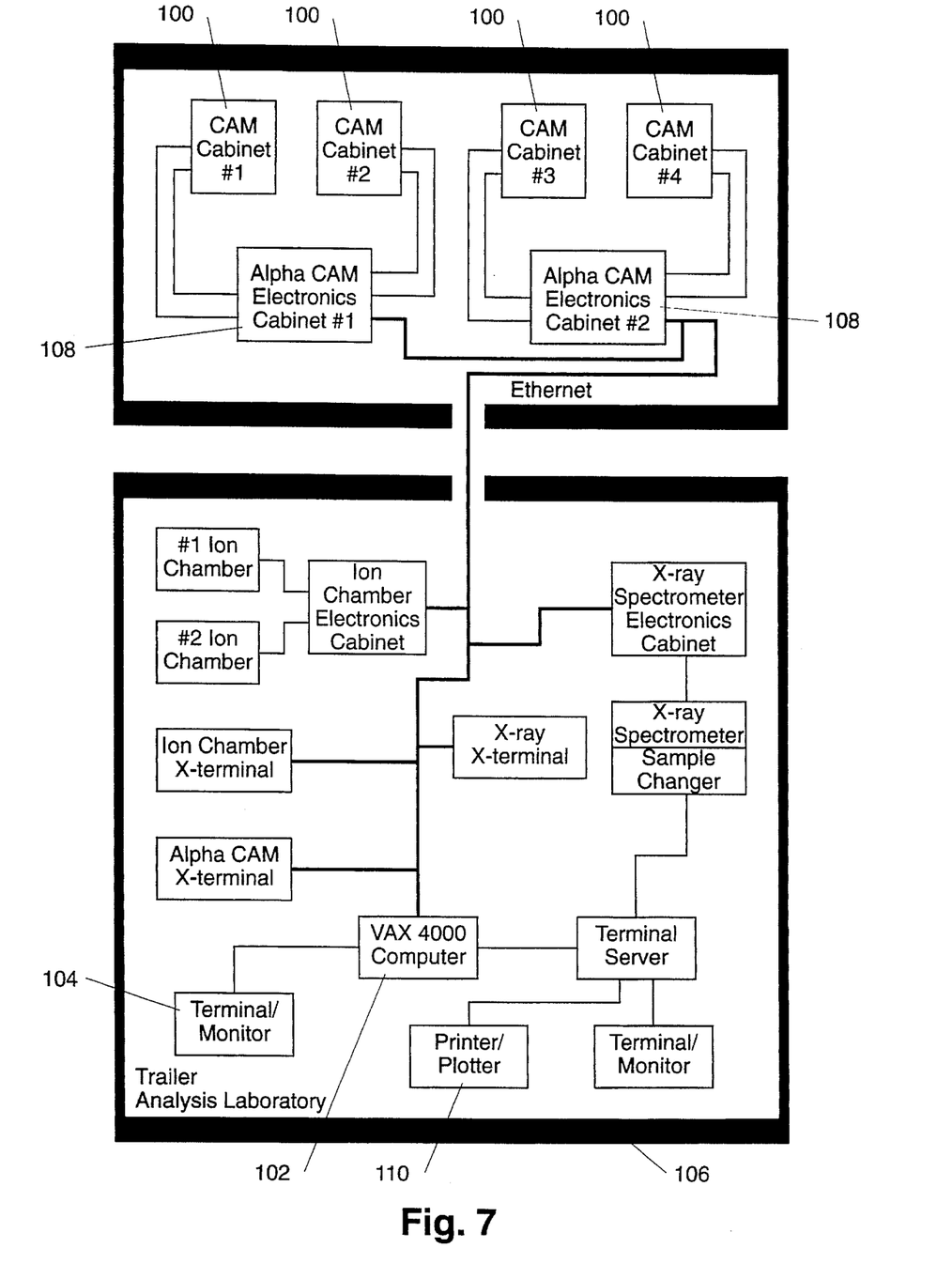
FIG. 7 is a block diagram of the system electronics.

Referring now to FIG. 2, each of the alpha CAMs 20 consists of a two-stage inertial impactor 22, two air sampling pumps 24 and 26, two mass flow sensors 28 and 30, silicon alpha detector assembly 32, and preamplifier 34. Preferably the inertial impactor 22, silicon detector assembly 32, preamplifier 34, air sampling pumps 24 and 26, and mass flow sensors 28 and 30 are housed in one cabinet and the electronic circuits are housed in a separate electronics cabinet. The electronics for two CAMs may be housed in a separate electronics cabinet (FIG. 7). For each CAM 20, the major and minor air flows 36 and 38 through the inertial impactor are continuously monitored using two mass flow sensors 28 and 30 (Sierra Instruments, Inc., Accu-Mass Flow Meter model 730-12 V; and McMillian Co., Flo-Sensor model 110-11). Because the preamplifier 34 is temperature sensitive and outside temperatures vary diurnally, the upper half 39 of each CAM sampling cabinet is insulated and equipped with a heater/air conditioner 40 to keep the temperature inside the cabinet constant. Each electronics cabinet is insulated and equipped with an air conditioner to compensate for the heat generated by the electronics modules.

In operation, the air enters the impactor at 42, and aerosols are separated into the major air flow 36, which generally is over 90% of the air entering the impactor, and the minor air flow 38, which is typically less than 10% of the flow in the impactor.

Figure 4:
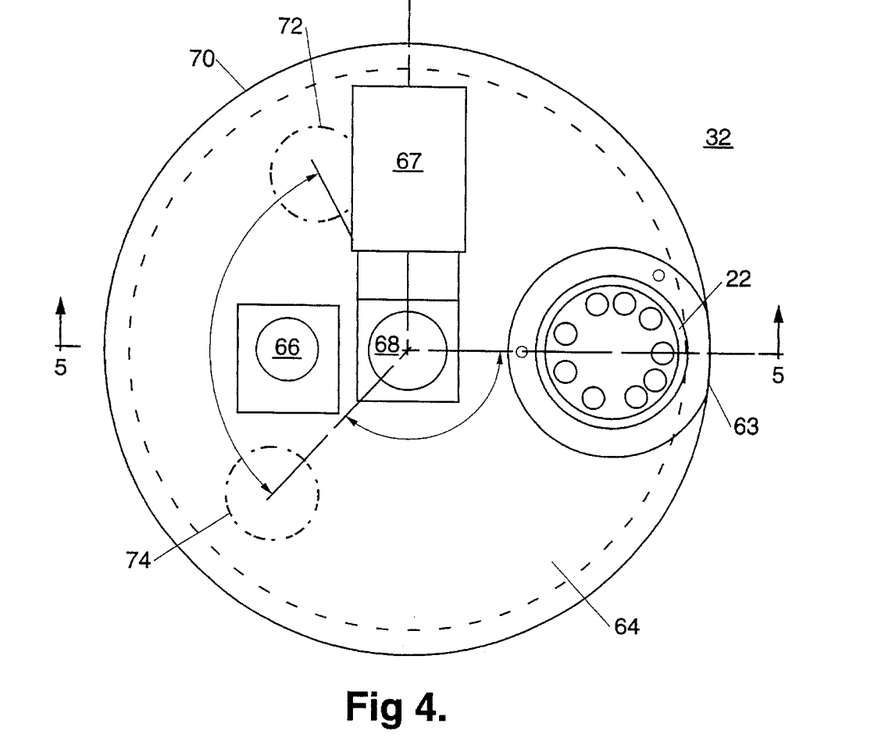
FIG. 4 is a plan view of the base plate and mounted impactor and stepping motor.
Figure 5:
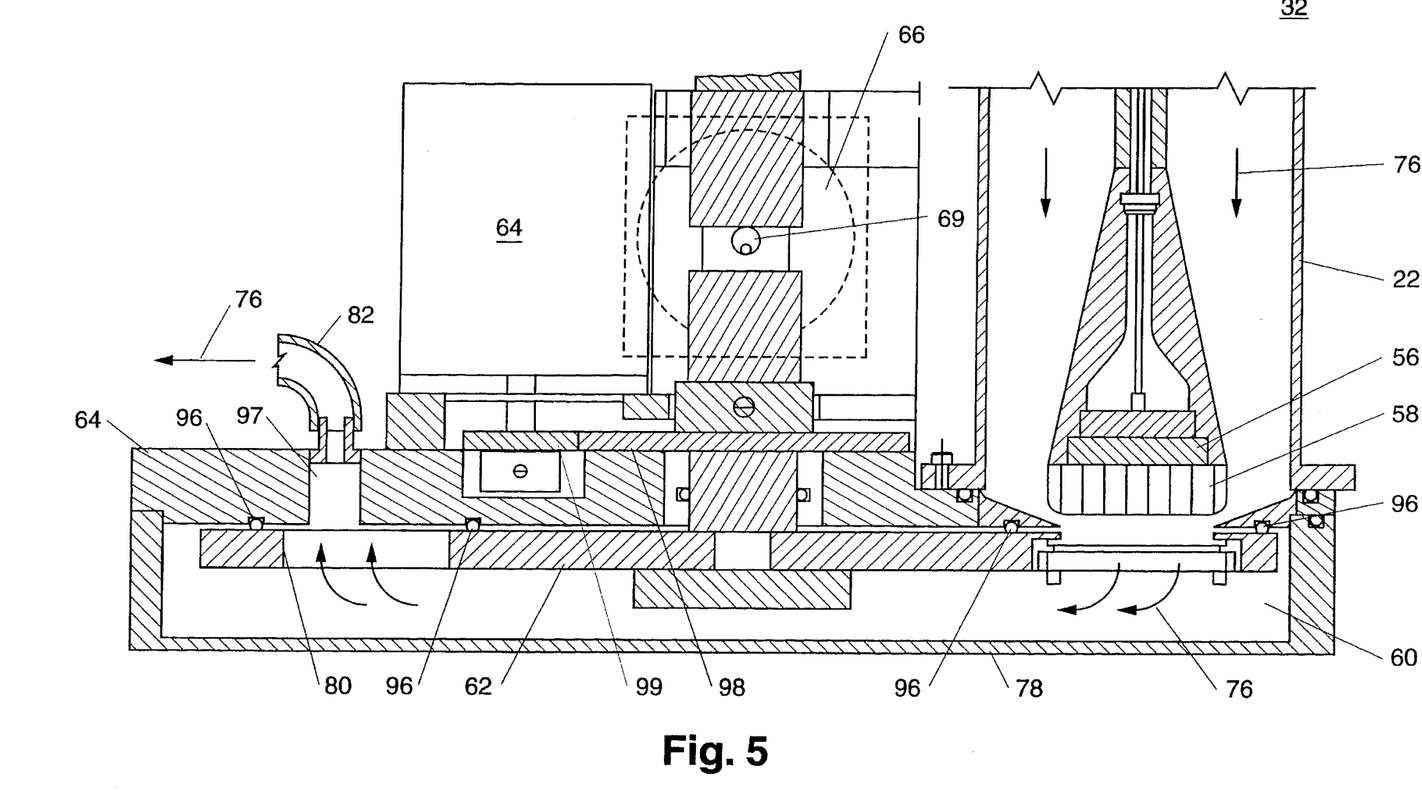
FIG. 5 is a section view of the filter tray and apparatus taken through lines 5—5 of FIG. 4.

Referring now to FIG. 2, the air flow can be better seen in the cross-sectional view of the impactor 22 which is part of detector assembly 32 (FIGS. 4 and 5). Air enters nine first-stage jets 44 where the lighter aerosol particles follow a transverse trajectory 46, whereas the heavier particles continue through receiver 48 entering transition cylinder 50 and then pass through second-stage jets 52 where a second transverse flow 54 occurs, leaving minor flow 38 to pass around a first detector 56 and collimator 58 and through filter assembly 60 that is mounted on a rotatable indexing disc 62.

Referring now to plan view of the detector assembly 32 in FIG. 4, the impactor 22 is mounted in a first sector 63 of base plate 64 over the first filter assembly (not shown). A disc-indexing stepping motor 66 mounted on base plate 64 adjacent to a disc raise-and-lower stepping motor 67 is used to raise and lower the drive shaft 68 and the attached indexing disc 62 by means of eccentric cam 69 (FIG. 5).

As can be seen in FIG. 4 a second sector 70 is located 120° from first sector 63 and the location of a sample decay position 72 is shown in phantom. A third sector position is shown at 74 which is another 120° from second position 72. This is the location for the second silicon detector of the invention.

The cross-section view in FIG. 5 shows the interrelationship between the various components of the detector assembly 32. The air sample 76 passes around the detector 56 and collimator 58 through the filter assembly 60, within the cover 78 and through a vent hole 80 to exit the base 64 at tubing 82 that connects to flowmeter 30 (FIG. 2). There are three vent holes 80 in indexing disc 62 that are oriented 180° from each of the three sample and decay locations at 63, 72, and 74 of FIG. 4, respectively.

Figure 6:
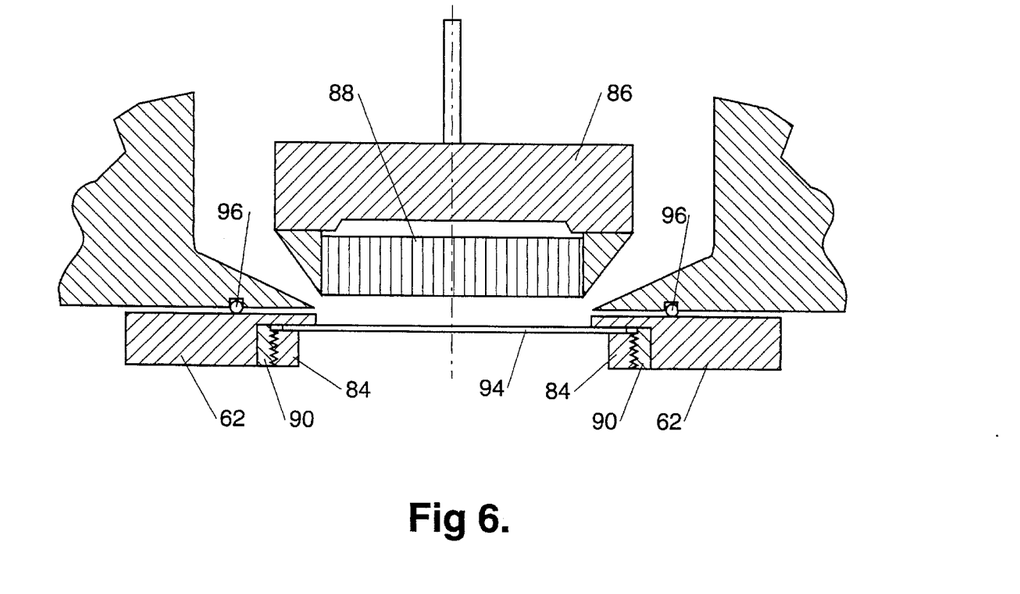
FIG. 6 is a section view of the detector collimator and filter.

The configuration of the filter holder 84 within indexing disc 62 can be seen in the cross-section of FIG. 6. This section would be as seen at third sector 74 having the second alpha sampling detector 86 with its attached collimator 88. The filter holder consists of internal threaded brass ring 90 engaging aluminum holder ring 84 which retains filter 94 within indexing disc 62. The indexing disc 62 must be lowered prior to rotation and raised following rotation to create a seal using O-ring seals 96. These two O-rings that seal the sample filter assembly 60 and vent hole 97 must be uncompressed by lowering the disc 62 before rotation. The O-ring is needed around the exhaust port 97 as seen in FIG. 5 to balance the disc by providing a second compression point.

The stepping motors are stepped 200 pulses per revolution, thus, to raise or lower the drive shaft, 100 steps are required for half rotation of cam 69. The reason for gears 98 and 99 is to permit disc 62 to be rotated exactly 120°. The gears are required since 200 steps are not evenly divisible by 3.

FIG. 7 is an electrical block diagram illustrating the basic components and connections when using the multiple remote CAM cabinets 100 and VAX computer 102 and terminal monitors 104 in a mobile analysis laboratory 106.

Figure 1:
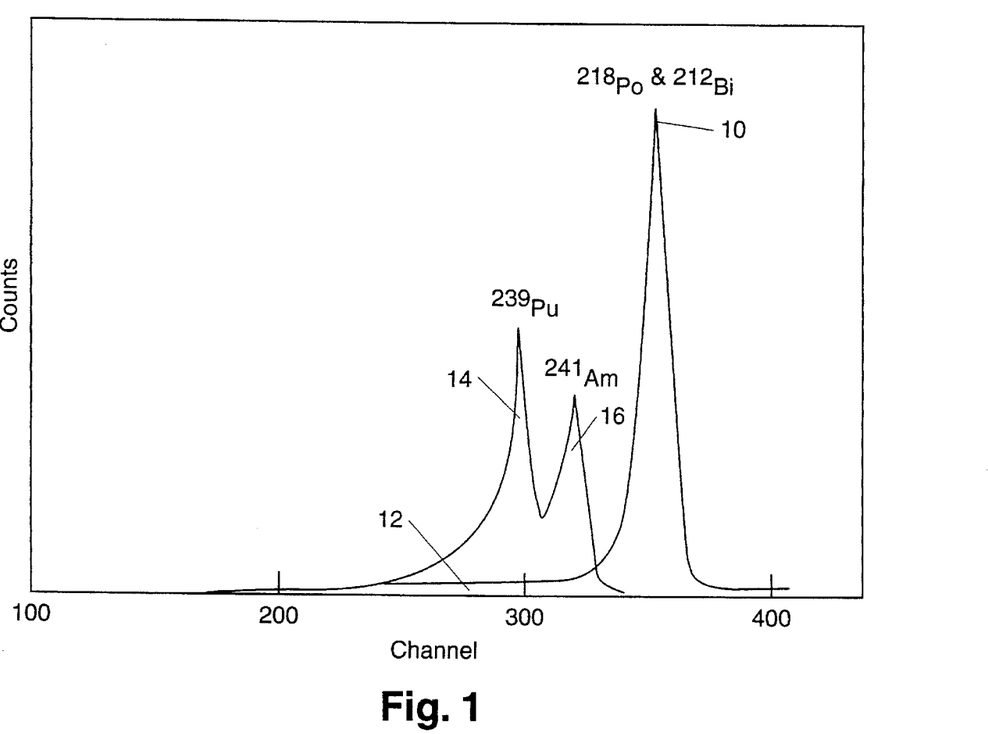
FIG. 1 is a copy of a spectrograph of a typical spectrum for TRU and radon daughter isotopes.

Operation of the system will be described in reference to FIGS. 1–7. The RTML alpha CAMs 20 measure alpha activity in air by pulse-height analysis of the alpha activity removed from air that is sampled (FIG. 1). The measurement of airborne alpha-emitting radionuclides is performed by pulling a continuous sample of ambient air through a two-stage impactor 22 and then through a filter 94 having a pore size small enough to trap aerosolized particles. The impactor 22 removes a large fraction of the naturally occurring alpha-emitting radon daughter isotopes from the airstream before it passes through the sample filter. The alpha-emitting radionuclides are attached to the aerosol particles that are trapped by the filter. Alpha activity on the filter is measured by a collimated solid-state silicon detector 56 positioned about 7 mm from the influent face of the filter.

Figure 3:
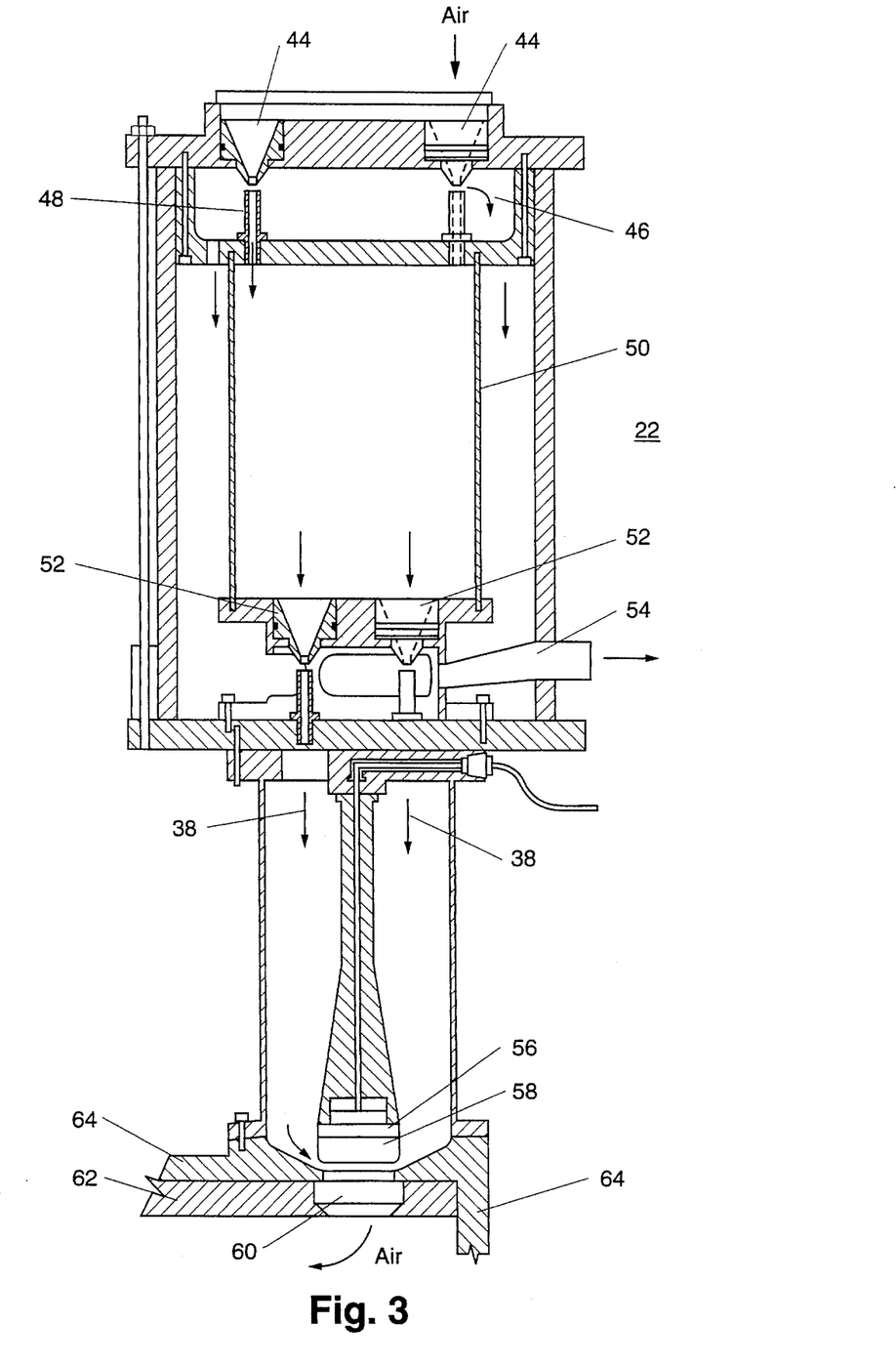
FIG. 3 is cross-sectional view of the air particle impactor used in the invention.

Air, which is sampled at the relatively high rate of 280 L/min (10 ft$^3$/min), is drawn through a circular array of nine inlet jets 44 and is directed towards a complementary array of receiving tubes 48. A major portion of the air leaving the jets (200 L/min) is drawn off laterally at 46 before the airstream enters the receiving tubes. Small particles entering the inlet jets follow the lateral flow of air and do not enter the receiving tubes. Large particles not able to follow the lateral airflow enter the receiving tubes 48. This arrangement is repeated in a second stage 52 in the impactor, with the lateral flow in this stage being 60 L/min. In principle, the minor (20 L/min) airflow 38 exiting the second set of receiving tubes contains most of the TRU-bearing particulates that entered the impactor 22. This minor airflow is directed to a sample collection filter adjacent to a collimator and a solid-state silicon detector.

Each alpha CAM 100 consists of the impactor, two 900-mm$^2$ solid-state silicon detectors equipped with gridded collimators, two detector bias supplies, two preamplifiers, two linear amplifier, two analog-to-digital converters (ADCs), multiplexer, and acquisition interface module (AIM). As shown in FIGS. 2 and 7, the CAM impactor, silicon detectors, preamplifiers, air sampling pumps, and mass flow sensors are housed in cabinet 100, and the detector bias supplies, linear amplifiers, analog-to-digital converters (ADCs), multiplexer, and AIM are housed in a separate electronics cabinet 108. As shown in FIG. 7, the electronics for two CAMs are housed in one electronics cabinet 108. Thus, for the case of four CAMs, there are four CAM sampling cabinets 100 and two electronics cabinets 108. For each CAM, the major and minor airflows through the CAM are continuously monitored using two mass flow sensors 28 and 30. The voltage output of each mass flow sensor is input into a multiplexer so that the flow data can be stored along with the spectral data being stored in the AIM. Both flow rates are displayed and routinely updated in the corresponding spectrum display window on the alpha CAM X-terminal monitor 104 that in the present configuration is located inside the RTML analysis trailer 106. Because the preamplifiers are temperature sensitive, the upper compartment 39 of each CAM cabinet is insulated and equipped with a heater/air conditioner 40. Each electronics cabinet is insulated and equipped with an air conditioner to compensate for the heat generated by the ADCs and AIMs.

The CAMs are controlled from and spectral data transmitted to the VAX 4000 Model 100 computer 102 installed in the RTML analysis trailer 106 using an Ethernet coaxial cable link between the VAX computer and the four acquisition interface modules installed in two CAM electronics cabinets. The current spectrum and status of each of the CAMs are displayed on an X-terminal monitor 104 in the RTML analysis trailer. For each CAM, a plot of the concentrations of airborne TRU isotopes during the previous 48 hours is displayed on the same monitor used to display CAM status. Hard copies of the concentrations of airborne TRU isotopes measured at regular intervals over any given sampling period are prepared using a laser printer 110.

The alpha CAMs 100 are calibrated using standards that contain alpha-emitting isotopes. Standards used for energy calibration each consist of a 47-mm diameter stainless-steel disk having a total of 9 nCi of $^{237}$Np, $^{239}$Pu, $^{241}$Am, and $^{244}$Cm deposited on one surface of the disk. Standards used to measure the absolute counting efficiency of the alpha CAMs each consist of a 47-mm diameter filter having a total of 4 nCi of $^{239}$Pu deposited on one surface of the filter. The normal sample filters used during any given air sampling will become contaminated with whatever isotopes are present in the air that is sampled. In addition to alpha-emitting TRU isotopes, beta- and gamma-emitting isotopes could also be collected on each CAM filter. The quantity of activity of any given isotope collected on the sample collection filter will depend on the airborne concentration of the isotope, sampling flow rate, and sampling duration.

While a preferred embodiment of the invention has been disclosed, various modes of carrying out the principles disclosed herein are contemplated as being within the scope of the following claims. Therefore, it is understood that the scope of the invention is not to be limited except as otherwise set forth in the claims.

I claim:

1. An alpha continuous air monitor (CAM) system comprising:
   (a) air flow means for conducting an air stream through an alpha detector assembly;
   (b) an indexing disc having a plurality of filter assemblies capable of collecting airborne alpha-emitting particles, said filter assemblies located an equal distance from the center of said indexing disc and at approximately equal distances from each other;
   (c) means for vertically moving the indexing disc to physically engage and disengage the alpha detector assembly and indexing disc so that when the indexing disc and alpha detector assembly are engaged a filter assembly on the indexing disc is aligned with a minor air flow conduit within the alpha detector assembly;
   (d) means for rotating the indexing disc a distance equal to the predetermined distance between filter assemblies;

(e) first alpha detector means within said minor air flow conduit for detecting alpha-emitting particles collected on the filter assembly aligned with the minor air flow conduit;

(f) a decay location located a distance from the first alpha detector equal to the distance between filter assemblies so that a filter assembly rotates from the first alpha detector means to align with the decay location, the radioactivity of said filter assembly aligned with the decay location then being allowed to decay to lower alpha levels;

(g) second alpha detector means located an equal distance from said first alpha detector means and said decay location, so that a filter assembly rotates from the decay location to align with the second alpha detector means;

(h) electronic means for controlling, monitoring, and displaying data for the air monitor system, so that the first alpha detector means measures alpha particles on the filter assembly aligned with said minor air flow conduit and the second alpha detector means measures alpha particles on the filter assembly aligned with it;

(i) calculating means for determining the transuranic isotope concentration from the alpha activity levels measured by the first and second alpha detector means.

2. The system of claim 1 wherein said first and second alpha detector means are comprised of a planar silicon detector and attached collimator.

3. The system of claim 1 further comprising a cabinet containing said detector assembly, said cabinet having temperature control means for maintaining a stable temperature within the cabinet.

4. The system of claim 1 wherein the moving means to engage and disengage the alpha detector assembly and indexing disc comprises a stepping motor controlled by said electronic means, wherein said stepping motor rotates a cam thereby moving a drive shaft connected to said indexing disc.

5. The system of claim 1 wherein the rotating means comprises a geared stepping motor controlled by said electronic means.

6. The system of claim 1 wherein the electronic means further comprises a computer interconnected to a CAM monitor, terminal monitor and printer plotter.

7. The system of claim 1 further comprising a flow sensor for measuring air flow that is drawn off from the alpha detector assembly and a flow sensor in said minor air flow conduit for measuring air flow through the alpha detector assembly.

8. The system of claim 1 wherein a transuranic (TRU) airborne concentration during a sample period is based on subtracting the net alpha peak counts at the beginning of the sample period; and the net counts resulting from TRU activity already deposited on the filter at the beginning of the sample period from the net alpha peak counts at the end of the sample period.

9. The CAM system as recited in claim 8 wherein a calculation for the TRU concentration during sampling interval n comprises:

$(X_{Pu})_n = [C_n - C_{n-1} - AC_{AN-1}]/B$ where:

$C_n$ = net counts in a given TRU alpha peak at an end of sampling interval n measured by the first detector;

$C_{n-1}$ = net counts in a given TRU alpha peak at the beginning of sampling interval n measured by the first detector;

$C_{An-1}$ = net counts in a given TRU alpha peak in a spectrum measured by the second detector;

$(X_{Pu})_n$ = airborne concentration of TRU isotope during sampling interval n (pCi/liter); and where A and B are constants based on sampling times, flow rates, and efficiencies being constants instead of variables.

10. The system of claim 1 wherein the indexing disc is rotated at regular time intervals greater that three minutes.

11. The system of claim 1 wherein the indexing disc is rotated the predetermined distance when the first alpha detector means has detected alpha activity that exceeds a predetermined level.

12. The system of claim 1 wherein the indexing disc has three filter assemblies.

13. The system of claim 1 wherein the air flow means is a two-stage air particle impactor having a major air flow conduit and a minor air flow conduit, said minor air flow conduit directed toward the alpha detector assembly.

14. A method for providing a continuous sampling of concentrations of airborne alpha emitting transuranic (TRU) isotopes, the method comprising:

(a) drawing an air sample through an impactor, said impactor diverting a major portion of the air sample to a major air flow conduit and a minor portion to a minor air flow conduit;

(b) providing a disc having multiple alpha collection filter assemblies capable of collecting airborne alpha-emitting particles, said filter assemblies located an equal distance from the center of an indexing disc and at approximately equal distances from each other;

(c) passing the minor air flow through a first filter assembly aligned with a first alpha detector, said detector measuring the alpha activity from the first filter assembly;

(d) passing the minor air flow through a second filter assembly while the first filter assembly undergoes natural radon product decay;

(e) rotating the disc a distance substantially equal to the distance between said filter assemblies so that a third filter assembly is aligned with said first detector, the second filter assembly is aligned with a decay location, and the first filter assembly is aligned with a second alpha detector;

(f) measuring continuously the alpha activity on each filter assembly aligned with the first and second alpha detectors; and (g) calculating the airborne alpha concentration based upon the subtraction of the alpha activity measured by the second alpha detector from the alpha activity measured by the first alpha detector for each filter assembly.

15. The method of claim 14 wherein the disc is rotated at approximately ten minute intervals.

16. The method of claim 14 wherein the a computer is used to calculate the alpha concentrations.

17. The method of claim 14 wherein the minor air flow conduit contains the majority of TRU-bearing particles entering the impactor.

18. The method of claim 14 wherein the disc is rotated when the alpha activity level on the first filter assembly exceeds a predetermined level.

* * * * *